Oct. 31, 1967 W. T. PFISTER 3,350,014
FLOCK-APPLYING APPARATUS
Filed Oct. 21, 1965
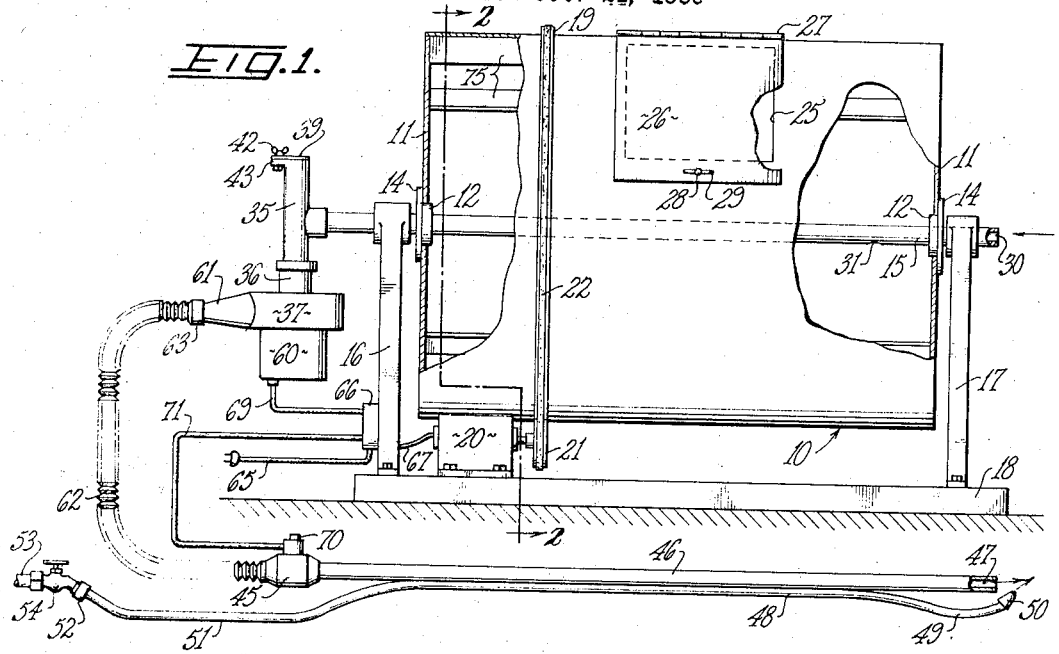
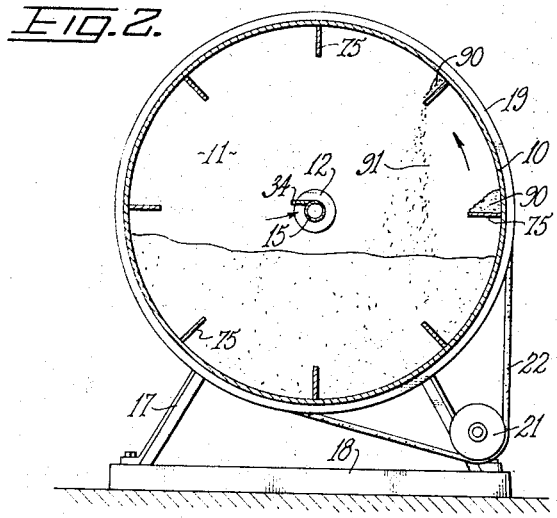
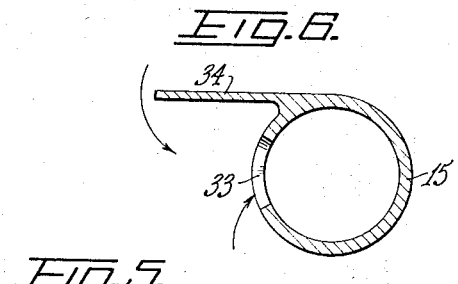
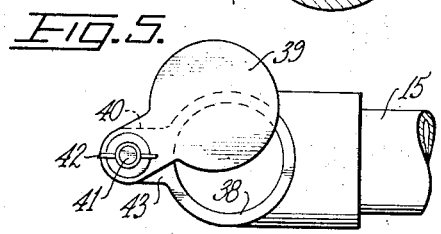
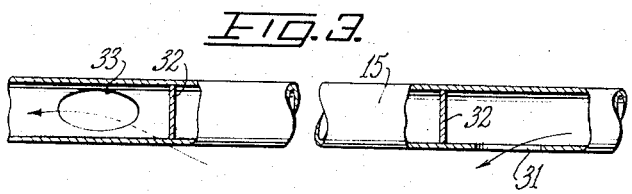
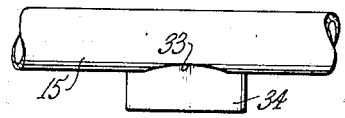
INVENTOR.
WILLIAM T. PFISTER
BY
*Lynn H. Latta*
ATTORNEY

United States Patent Office 3,350,014
Patented Oct. 31, 1967

3,350,014
FLOCK-APPLYING APPARATUS
William T. Pfister, 6740 Springpark Ave.,
Los Angeles, Calif. 90046
Filed Oct. 21, 1965, Ser. No. 499,225
8 Claims. (Cl. 239—144)

This invention relates generally to flock-applying apparatus and more particularly to improved flocking apparatus that solves various problems encountered in certain previous flocking machines or apparatus.

One of the major problems of flock-applying apparatus is the clogging of the equipment should there be blocking of the discharge hose, even momentarily. For example, if the hose or conduit from the blower is lying on the ground and stepped upon, the conduit upstream of the restricted portion and the blower itself almost instantly becomes clogged, and considerable time and work is involved in digging out the flocking in the blower and conduit as such flocking is packed therein with considerable force. The same results occur should the hose become kinked.

Another problem is encountered when flocking is being applied to a tall article such as a Christmas tree having a height above the range of 5'–6'.

The general object of the invention is to provide a flocking machine of relatively simple construction, yet reliable in operation, and which can be used for flocking relatively tall Christmas trees by an operator standing on the ground.

Toward the attainment of this general object, the invention provides a flocking apparatus:

(1) Wherein blocking of the discharge hose or conduit or the outlet of the blower will not result in clogging up of the apparatus including the blower and the hose upstream of any restriction therein;

(2) That will break up lumps of flock in the hopper and give a constant, uniform flow of loose flock to the blower;

(3) Wherein the amount of flock supplied to the blower may be varied as desired to meet various requirements and operating conditions;

(4) Employing a rotatable drum for containing the flocking material and having novel outlet means therefor which will take in loose flock but which will prevent lumps or the like from clogging the outlet;

(5) That is simple and durable in construction and relatively inexpensive to manufacture, yet effective and efficient in operation;

(6) Having relatively few parts.

Other objects and advantages will become apparent in the ensuing specification and appended drawing in which:

FIG. 1 is a side elevation of a flock-applying machine embodying the present invention, portions thereof being broken away to show the interior construction;

FIG. 2 is a sectional view taken on line 2—2 of FIG. 1;

FIG. 3 is a fragmentary longitudinal sectional view, in a vertical axial plane, of the axle tube structure;

FIG. 4 is a fragmentary inverted plan view of the same;

FIG. 5 is a detail top plan view of the control means regulating the amount of flock supplied to the blower; and FIG. 6 is a detail cross sectional view of the flock inlet in the axle pipe of the drum.

Referring more particularly to the drawings, the device comprises a cylindrical drum 10 having end walls 11 which close the ends thereof, said end walls having aligned openings arranged axially with respect to the drum and in which are secured bushings 12. Each bushing is provided with a radially extending annular flange 14 which abuts against the outer side of the respective end wall 11 and to which said flange is secured by welding or other suitable means.

The drum is disposed horizontally and is rotatable on an axle pipe 15 which is fixed, at respective ends thereof, in the upper ends of supporting A-brackets 16, 17 mounted on a base 18, the bushings 12 having end-bearing engagement with brackets 16, 17 so as to retain the drum in position axially.

The drum is provided with an external ring-pulley 19 which is secured thereto by any suitable means such as welding or brazing. An electric motor 20, secured to the base 9, is provided with a pulley 21 aligned with the pulley 19 and connected therewith by means of a belt 22. The pulley 21 on the shaft of the electric motor 20 is relatively small whereas the diameter of the pulley 19 is relatively large so that the drum will rotate at a relatively slow rate.

A loading opening 25 is provided in the cylindrical wall of the drum and is adapted to be closed by an external door 26 hinged at one side, as at 27, to the cylindrical wall of the drum 10. The door 26 is releasably secured in the closed position by means of a latch 28 which, as such latch may be of any suitable well-known type, is not disclosed in detail. The latch includes a handle 29.

The pipe 15 has an open end providing an inlet 30 for entry of air as indicated by the arrow at the rightward end of FIG. 1; is provided with a port 21 within the drum near the inlet 30; and is blocked by a plug 32 adjacent the port 31, on the side thereof remote from inlet 30, whereby air is drawn into the outer end of the pipe and passes therefrom into the drum through the port 31, air being prevented from flowing further through the pipe 15 by the plug 32.

The port 31 is located on the bottom side of pipe 15 so as to discharge a stream of air downwardly into the drum and to avoid the dropping of any flock into the port 31, which would tend to clog the inlet portion of tube 15.

The pipe 15 is provided with a second port 33 adjacent the other end of the drum, which may be termed the flock outlet port. The pipe 15 is provided with a second plug 32 adjacent the port 33. Port 33 is disposed in the side of tube 15 and is protected by a deflector 34 which prevents any lumps or flock or foreign material such as chunks of metal, etc. (which often are present as a contaminate in flock) from entering the port 33. The outer end of the pipe 15, beyond port 33, is connected to an intermediate portion of an auxiliary air inlet tube 35, the lower end of which is connected to the inlet 36 of a blower 37. The upper end of tube 35 (FIG. 4) has an air inlet opening 38 the size of which is controlled by a disc valve 39 having an ear 40 with an opening therein for reception of a screw 41 having a hingle nut 42, the screw 41 being also received in an opening provided therefor in a lug 43 on the upper end of the tube 35. Thus, the valve 39 may be pivotally moved on the screw 41 to vary the air inlet opening 38. The nut 42 may be loosened to permit the pivotal movement of valve 39 and tightened to frictionally hold said valve in adjusted positions.

The blower 37 may be of any well-known type and has a fan driven by an electric motor 60. Blower 37 has an outlet 61 to the outer end of which one end of a flexible hose or tube 62 is connected and held thereon by a clamp 63 of any well-known character. At the other end of the hose 62 there is a coupling collar 45 adapted to receive one end of a long flock-delivery tube 46 of lightweight material such as hard fiber (e.g., phenolic impregnated fibrous material) or thin-walled aluminum. The flock tube 46 has a length (e.g., 4½ ft. to 5 ft.) long enough to reach the top areas of a tall Christmas tree (e.g., 10 ft.) when held by an operator of average height (e.g., 5 ft. 9 in.). It has a free end which is open to provide a delivery mouth 47. Secured to one side of flock tube 46 and extending substantially from end to end thereof, is a water-spray tube 48 having, adjacent the delivery end of flock tube 46, an end portion 49 which is arched away from tube 46 and terminates in a nozzle 50 directed across the delivery mouth 47 so as to discharge a water spray that will deflect the issuing flock stream laterally onto the article being flocked as indicated by the arrows. At its other end, spray tube 48 has a portion 51 offset laterally from flock tube 46 and provided with a hose coupling 52 adapted for coupling the tube 48 to a flexible water hose 52 (e.g., garden hose) which in turn is adapted to be coupled to a water supply outlet such as the hose bib 54.

The motors 20 and 60 are supplied with electrical current from any suitable source to which an electric supply cord 65 is attached. The cord 65 leads to a junction box 66 from which the motor 20 receives electric current through a lead cable 67. Motor 60 has an electrical connection 69 from the junction box 66 and there is an electric switch 70 adjacent the flock tube 46 for controlling the motor 60, said switch being connected into the motor circuit by means of a lead cable 71. The supply of electric current to the motor 20 may be controlled by a switch of any suitable character which may be interposed in the circuit comprising the cable (e.g., in junction box 66) such switch not being shown herein.

There are a plurality of annularly spaced longitudinally extending bucket blades 75 attached to the innner side of the cylindrical wall of the drum 10, said blades being secured by any suitable means such as welding, brazing or other attachment means.

In operation, the drum is loaded with a flock mix comprising short fibers (e.g., cotton linters) mixed with a suitable adhesive, in dry powder form, which is moistened to adhesive character immediately upon contact with the water spray delivered from nozzle 50.

To load the drum, the door 26 is opened and the flock is poured into the drum through the opening 25. When the drum is approximately half full, the door 26 is closed. The mechanism is then ready to be operated. The motor 20 is turned on and effects rotation of the drum 10. As the latter rotates, the blades 75 on the internal cylindrical wall of the drum 10 raise quantities of flock, as best indicated at 90 and as the blades 75 are moved arcuately upwardly the flock is dropped off for free fall into the central area of the drum, as indicated at 91.

The air drawn into the drum through outlet port 31 will be directed downwardly against the body of flock and adhesive and will thence be deflected upwardly into the flock falling from the bucket blades 75, dispersing the same into a cloud of loose, floating flock particles. The inlet port 33 is disposed in the side of the axle pipe 15, facing horizontally away from the upwardly moving side of the drum and away from the path of fall of flock from said bucket blades so as to inhibit the entry of concentrated quantities of flock into said discharge portion of the pipe. With the valve 39 adjusted for the quantity of flock desired for a particular flocking operation, the loose flock 91 floating in the drum 10 is drawn into the pipe 15 through the port 33 when the blower is operated, the deflector 34 preventing lumps of the flock and any sizeable foreign particles from entering pipe 15 and thereby preventing clogging or choking of the passages leading to the blower. Flock drawn into the pipe 15 passes into the tube 35 and thence into the blower by way of the inlet 36. The flock from the blower is discharged through the outlet 61 and into the hose 62.

The arrangement of ports 31, 33 in pipe 15 has been found fully satisfactory in operation, and yet provides an extremely simple construction wherein the pipe 15 serves the triple function of providing an axle on which the drum is mounted for rotation, an inlet tube for delivering air downwardly into the body of flock in the drum with an agitating effect which loosens the flock, the moving air being deflected upwardly so as to disperse the flock dropped from bucket blades 75 into a cloud of floating flock particles, and an outlet tube through which air-borne flock particles are drawn by suction through the blower 37 and delivered in a forced-air stream through the flock tube. From the hose 62, the flock enters the flock tube 46 and is discharged into the water spray from nozzle 50 to provide a mixture of adhesive and flock which is sprayed onto the surface to be flocked, the spray being delivered laterally from the upper end of the flock tube, which thus functions as a wand for reaching heights above the operator's head. As the flock is drawn into the pipe 15 and carried by the air drawn from the drum, through said pipe and into the blower, such air is replaced in the drum by outside air which is drawn into the inlet mouth 30 of the pipe and discharged from the port by varying the position of the valve 39. The quantity of air drawn from the drum, with its flock particles, will be varied so that adjustment of the quantity of flock drawn into the blower and discharged thereby is easily controlled. When the valve 39 is in the fully opened position, the blower will draw no air through the pipe 15 but will take in all the air through the tube 35.

Should the hose 62 be restricted or closed when the blower is operating, it has been found that the flock will not be packed into the discharge of the blower and that portion of the hose upstream of the restriction thereof due to the supplemental air drawn in through the tube 35 from the inlet opening 38 thereof. Thus, with the present mechanism the objects of the present invention are attained.

It is thought that the invention and many of its attendant advantages will be understood from the foregoing description and it is believed that it will be apparent that various changes may be made in the form, construction and arrangement of the parts of the invention and the method of operation thereof without departing from its spirit and scope or sacrificing all of its material advantages, the embodiment hereinbefore described being merely one arrangement.

I claim:

1. In a flock-applying apparatus: a flock container drum having respective end walls, a peripheral wall and internal bucket blades thereon; an axle pipe extending through said end walls and through said drum, said pipe having externally projecting intake and discharge portions and having, within said drum, an air discharge port communicating with said intake portion and an inlet port for the reception of air-borne flock, communicating with said discharge portion, and said pipe having means disposed between said discharge and inlet ports and preventing direct communication between said ports through said pipe; means supporting the respective ends of said pipe with the pipe extending horizontally and providing an axle on which said drum is rotatably mounted; means for rotating said drum so as to cause a body of flock therein to be carried upwardly by said bucket blades and dropped for free fall through the central area thereof; a blower having an inlet coupled to the discharge end of said axle tube for applying suction thereto so as to draw a stream of air-borne flock therethrough and having a discharge outlet for discharging said air-borne flock; a flexible hose coupled to said blower having one end coupled to said blower outlet; and a flock tube coupled to the other end of said flexible hose for delivering said air-borne flock in a stream.

2. Apparatus as defined in claim 1, wherein said discharge port is disposed on the underside of said axle pipe to prevent the entry into said discharge port of flock dropped by said bucket blades.

3. Apparatus as defined in claim 2, wherein said inlet port is disposed in the side of said axle pipe, facing horizontally away from the upwardly moving side of said drum and away from the path of fall of flock from said bucket blades so as to inhibit the entry of concentrated quantities of flock into said discharge portion of the pipe.

4. Apparatus as defined in claim 3, including a shield secured to the top of the axle pipe and projecting horizontally and tangentially therefrom above said inlet port so as to shield the same from chunks of flock and foreign particles dropped from said bucket blades.

5. In a flock-applying apparatus: a flock container drum having respective end walls, a peripheral wall and internal bucket blades thereon; an axle pipe extending through said end walls and through said drum, said pipe having externally projecting intake and discharge portions and having, within said drum, an air discharge port communicating with said intake portion and an inlet port for the reception of air-borne flock, communicating with said discharge portion, and said pipe having means disposed between said discharge and inlet ports and preventing direct communication between said ports through said pipe; means supporting the respective ends of said pipe with the pipe extending horizontally and providing an axle on which said drum is rotatably mounted; means for rotating said drum so as to cause a body of flock therein to be carried upwardly by said bucket blades and dropped for free fall through the central area thereof; a blower having an inlet coupled to the discharge end of said axle tube for applying suction thereto so as to draw a stream of air-borne flock therethrough and having a discharge outlet for discharging said air-borne flock; means providing an auxiliary air inlet to said discharge portion of the axle pipe for mixing additional air with said air-borne flock between said drum and said blower; a flexible hose coupled to said blower having one end coupled to said blower outlet; and a flock tube coupled to the other end of said flexible hose for delivering said air-borne flock in a stream.

6. Apparatus as defined in claim 5, wherein said auxiliary air inlet comprises an inlet tube rising from said discharge portion of the axle pipe and a valve on the upper end of said inlet tube for controlling the amount of air drawn therethrough.

7. In a flock-applying apparatus: a flock container drum having respective end walls, a peripheral wall and internal bucket blades thereon; an axle pipe extending through said end walls and through said drum, said pipe having externally projecting intake and discharge portion and having, within said drum, an air discharge port communicating with said intake portion and an inlet port for the reception of air-borne flock, communicating with said discharge portion, and said pipe having means disposed between said discharge and inlet ports and preventing direct communication between said ports through said pipe; means supporting the respective ends of said pipe with the pipe extending horizontally and providing an axle on which said drum is rotatably mounted; means for rotating said drum so as to cause a body of flock therein to be carried upwardly by said bucket blades and dropped for free fall through the central area thereof; a blower having an inlet coupled to the discharge end of said axle tube for applying suction thereto so as to draw a stream of air-borne flock therethrough and having a discharge outlet for discharging said air-borne flock; a flexible hose coupled to said blower having one end coupled to said blower outlet; and a flock tube coupled to the other end of said flexible hose for delivering said air-borne flock in a stream; said flock tube having a length in excess of four feet for reaching the top of an article having a height in the range of ten feet.

8. Apparatus as defined in claim 7, including a water spray nozzle attached to said flock tube near the discharge end thereof in a position to direct a water spray transversely of the stream of air-borne flock issuing from the flock tube, whereby to develop, from powdered adhesive mixed with the flock, a liquid adhesive adhering to the flock in the spray delivered from the end of said flock tube.

References Cited

UNITED STATES PATENTS

| | | | |
|---|---|---|---|
| 2,678,238 | 5/1954 | Schutz | 302—36 |
| 3,093,268 | 6/1963 | Smith et al. | 302—36 X |
| 3,239,146 | 3/1966 | Freda | 239—142 |

M. HENSON WOOD, Jr., *Primary Examiner.*

M. MAR, *Assistant Examiner.*